UNITED STATES PATENT OFFICE.

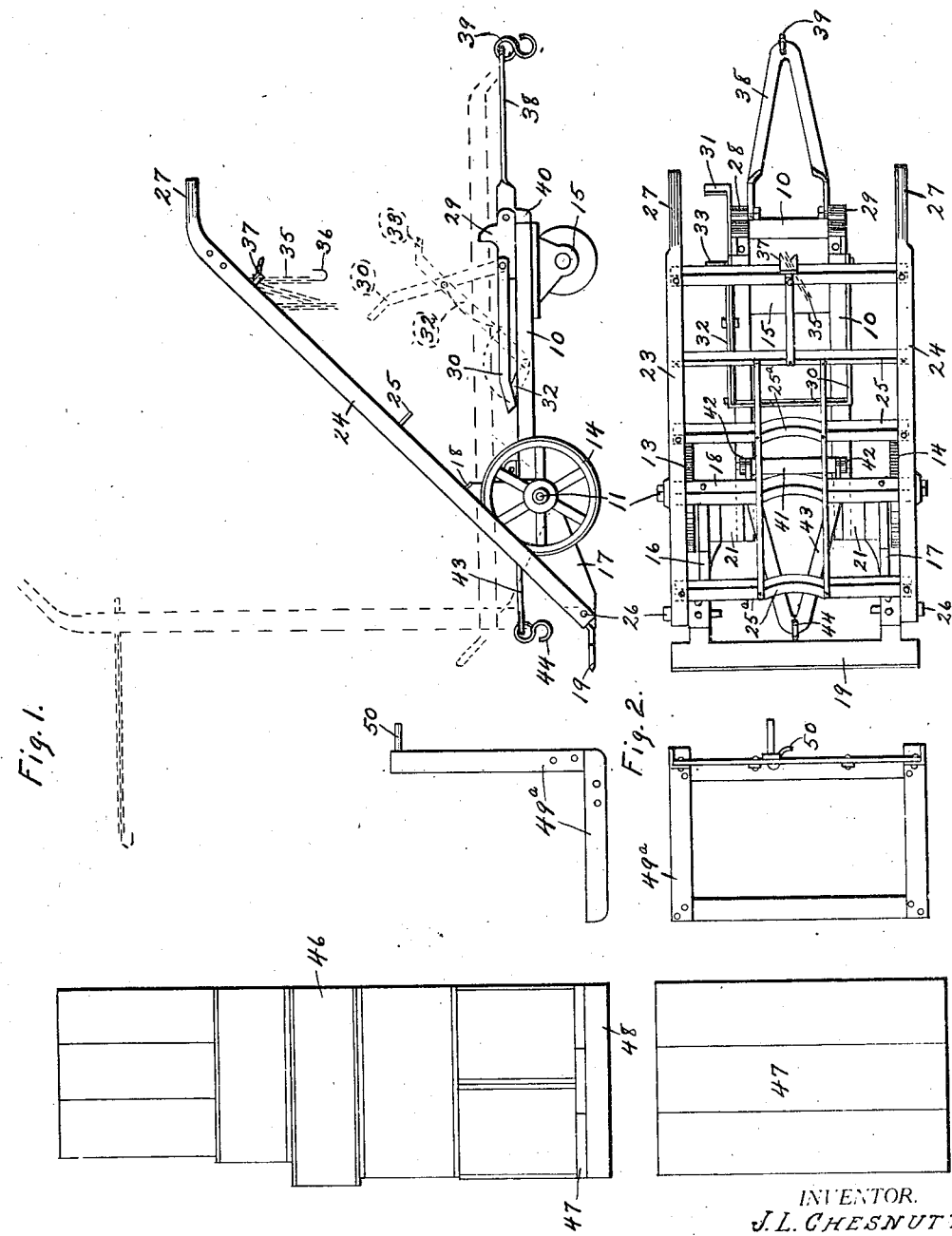

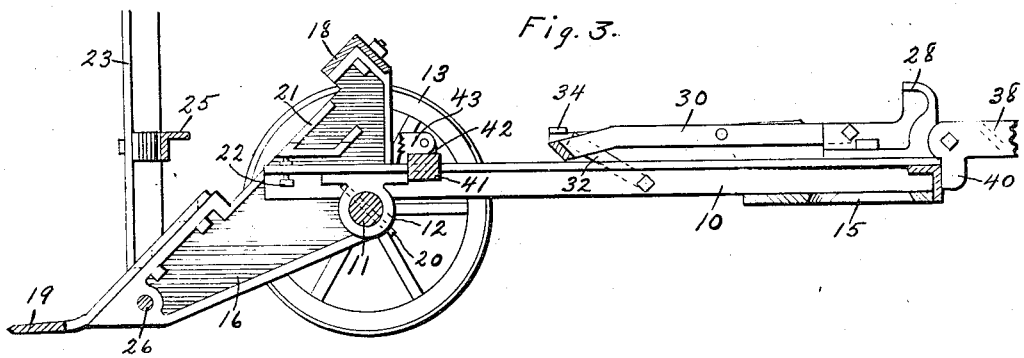
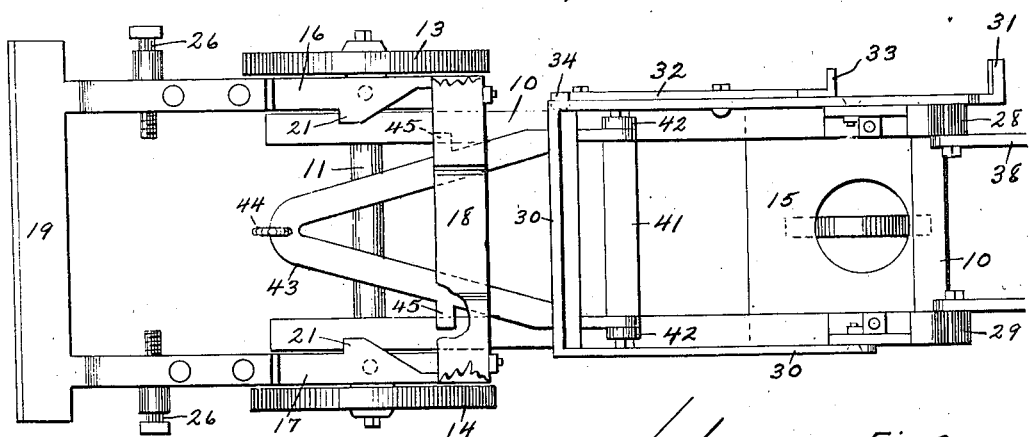
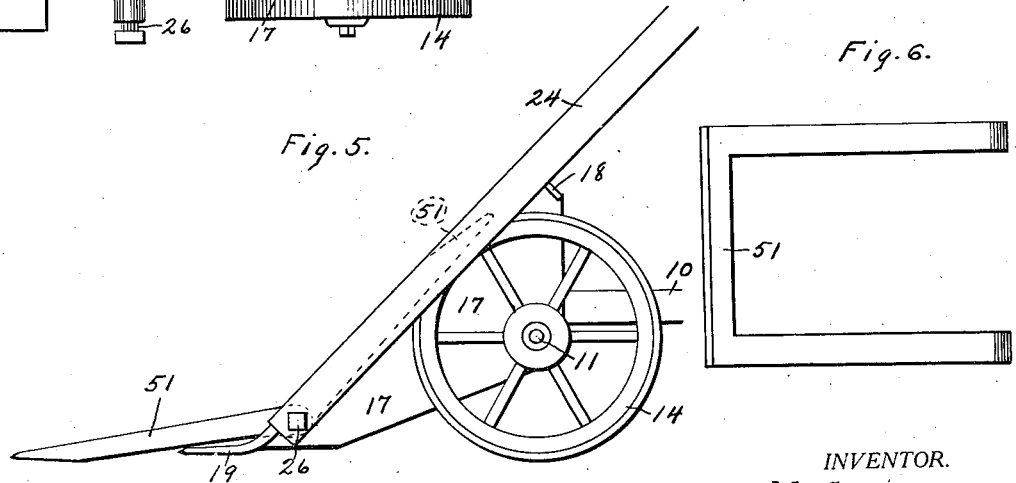

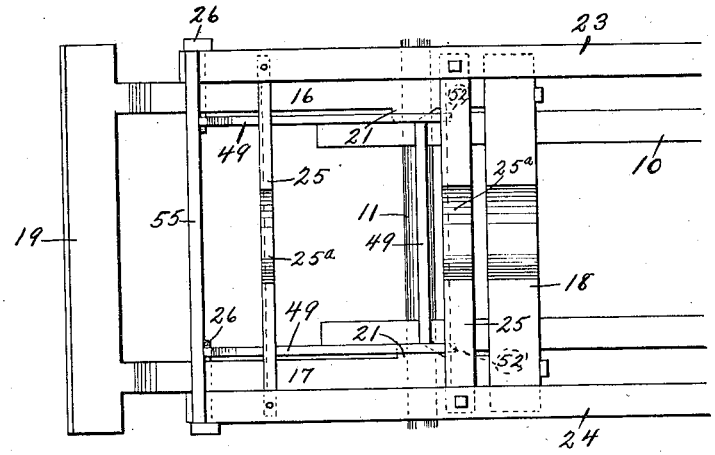
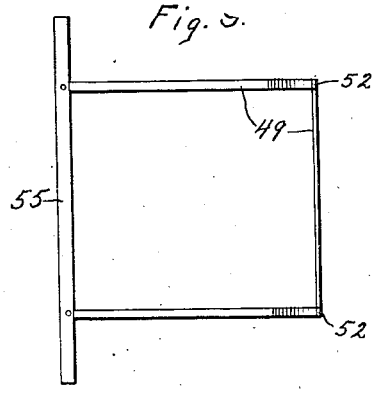
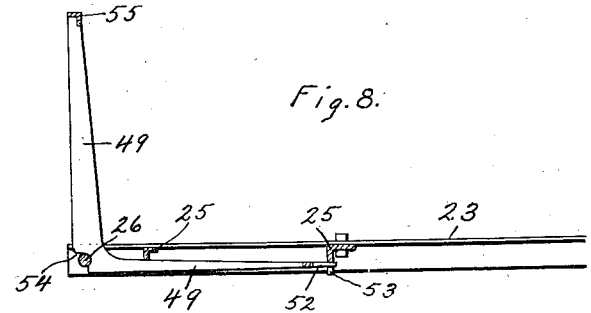

JOHN LOUCIEN CHESNUTT, OF KANSAS CITY, MISSOURI, ASSIGNOR TO THE CHESNUTT MANUFACTURING COMPANY, OF KANSAS CITY, MISSOURI, A CORPORATION OF MISSOURI.

COMBINED TILTING AND PLATFORM TRUCK.

1,308,934.            Specification of Letters Patent.       Patented July 8, 1919.

Application filed December 29, 1917. Serial No. 209,469.

*To all whom it may concern:*

Be it known that I, JOHN LOUCIEN CHESNUTT, a citizen of the United States, and resident of Kansas City, Jackson county, Missouri, have invented a new and useful Combined Tilting and Platform Truck, of which the following is a specification.

The object of this invention is to provide an improved truck partaking of the characteristics of both the tilting and platform types, and adapted for use in handling and transporting crates, boxes, bales, bags, barrels and similar loads.

A further object of this invention is to provide a truck having a wheel-supported frame member of the platform type, a tilting head carried by the forward end of the frame member and having a load-engaging nose, and a handle member pivoted on the forward portion of said tilting head.

A further object of this invention is to provide a truck having a wheel-supported frame member, a tilting head carried by the forward end of said frame member and provided with means for engaging a load, and a handle member pivoted on the forward portion of said tilting head, the handle member being independently movable to vertical position for convenience in receiving and depositing a load.

A further object of this invention is to provide a truck having a wheel-supported frame member, a tilting head carried by the forward end of said frame member and provided with means for engaging a load, and a handle member pivoted on said tilting head, the handle member being independently movable to vertical position for convenience in receiving and depositing a load and also being adapted to move said head and the load to various positions of rest on the frame member before and during transit.

A further object of this invention is to provide an improved construction for a truck capable of use by a single operator to engage, receive, transport and deposit a load easily, conveniently and rapidly.

A further object of this invention is to provide a supplementary carrier adapted to engage and support a composite load and in turn to be engaged and supported and secured to the load-engaging member of my improved truck and shifted with said member to various positions of rest on and relative to the frame or platform member of said truck.

A further object of this invention is to provide an improved folding support on the rear end of the frame or platform member adapted for engagement by and support of the load-engaging member at times, and means for conveniently moving said support into and out of operative position.

A further object of this invention is to provide improved means for mounting draw-bars at end portions of the frame or platform member, said draw-bars being movable to inoperative position when not in use.

A further object of this invention is to provide improved adjustable means for limiting downward and forward movement of the tilting head to prevent engagement of the load-engaging nose with the supporting surface, *i. e.*, the floor.

A further object of this invention is to provide an improved supplementary nose pivoted on the tilting head and adapted to overlie and be supported by the load-engaging nose at times for the support of certain kinds of loads.

A further object of this invention is to provide an improved flexible and adjustable device for engaging the upper portion of a load and securing the same to the handle member.

A further object of this invention is to provide a convenient and easily manipulated truck of the class described.

My invention consists in the construction, arrangement and combination of elements hereinafter set forth, pointed out in my claims and illustrated by the accompanying drawing, in which—

Figure 1 is a side elevation illustrating my improved truck in position for engaging the supplementary carrier which in turn is in position for engaging a composite load mounted on an elevated platform; dotted lines indicating the vertical position of the handle member for the purpose of engaging and receiving a load; other dotted lines indicating the handle member and tilting head moved together to substantially horizontal position of rest on the frame or platform member; other dotted lines indicating operative position of a support for maintaining the handle member, tilting member and load in an inclined position. Fig. 2 is a plan of the devices shown in Fig. 1, with the exception that the load is removed from the elevated platform. The draw-bars are also shown in extended positions in Figs. 1 and 2. Fig. 3 is a longitudinal section of my improved truck, portions of the handle member and draw-bars being broken away. Fig. 4 is a plan of the truck, the handle member being removed, a portion of the rear draw-bar being broken away to economize space. Figs. 3 and 4 are on a scale enlarged relative to Figs. 1 and 2.

Fig. 5 is a side elevation of a portion of the front end of the truck, showing an extension nose thereon for use in engaging certain kinds of loads, dotted lines indicating folded or inoperative position of such step. Fig. 6 is a plan of the extension nose detached.

Fig. 7 is a plan of a portion of the truck showing the preferred form of auxiliary carrier mounted on the handle member, which latter is in horizontal or transit position. Fig. 8 is a vertical section of part of the devices shown in Fig. 7. Fig. 9 is a plan of the carrier detached and in loading position.

In the construction of the device as shown, I employ three primary elements, namely a wheel-supported frame truck of the "platform" type, that is to say arranged permanently in horizontal position; a tilting head mounted for oscillation on a transverse horizontal axis at the forward end of the frame member, and provided with means for engaging and supporting a load; and a handle member pivoted on the tilting head and having a slight range of movement relative thereto when a load is not present, and adapted to assist in supporting the load and also providing means for manually guiding the device and for manually tilting the head and load to various positions of rest on the frame during transit.

The frame member or truck proper comprises a frame designated by the numeral 10, preferably constructed of skeleton form of angle iron suitably secured together. A forward axle 11 is pivoted in bearings 12 carried by the under side of the forward end of the frame 10, and forward supporting wheels 13, 14 are pivoted for rotation on projecting end portions of said axle, preferably being supplied with anti-friction devices of common form. The rear portion of the frame 10 preferably is supported by one or more swivel casters, designated generally by the numeral 15. The swivel caster 15, one only of which is shown, is not illustrated in detail but may be of any suitable construction, such for instance as is shown in Letters Patent of the United States Number 1,142,930, granted to me June 15, 1915; the construction of such caster being calculated to reduce friction and wear and permitting instant change of direction of travel of the rear end of the truck under lateral pressure, so that it may be easily steered by manual guidance.

The tilting head is pivoted on the axis of the forward wheels 13, 14 and comprises spaced flanged plates 16, 17 mounted on the axle 11 between the frame 10 and wheels 13, 14. The flanged plates 16, 17 are generally triangular in side elevation and are connected near one angle to the axle 11 while connected to each other near another angle, above the axle, by a cross-bar 18 of angle form, which projects at its ends beyond said plates and over the wheels 13, 14. A load-engaging nose 19 is fixed to and projects forwardly from the forward lower angle of the plates 16, 17 and is supported adjacent to, substantially parallel with and slightly spaced from the ground, floor or other supporting surface. I prefer to secure the flanged plates 16, 17 to the axle 11, as by pins 20, so that when the head is tilted said axle turns in its anti-friction bearings in the wheels 13, 14. On the inner faces of the flanged plates 16, 17 are formed inwardly projecting stops 21 projecting over and adapted to engage at times the side members of the frame 10 and limit forward oscillation of the tilting head. I prefer to make the engagement of the stops 21 with the frame 10 adjustable by tapping bolts 22 (see Fig. 3) into said frame 10, the heads of said bolts taking the actual contact with the stops or lugs and permitting of an adjustment, by being moved inwardly or outwardly, to compensate for wear or bending of parts. The stops so provided limit forward and downward movement of the tilting head in such manner that the load-engaging nose 19 is always supported clear of the floor but sufficiently near thereto to facilitate engagement beneath a load.

A relatively flat handle member is formed of side bars 23, 24, connected by cross-bars 25, all of which may be of angle iron, and straddles at its lower end and is pivoted on an axis 26 to the lower forward portion of the tilting head, through the flanged plates 16, 17 thereof. The side bars 23, 24 of the handle member are formed with grips 27 at their free ends for manual grasp, which preferably are bent out of the plane of the handle member in a common manner. The handle member is adapted to be moved forwardly through an arc to vertical position, as indicated by the foremost dotted position shown in Fig. 1, to facilitate receiving and depositing a load; or to be moved rearwardly through an arc to inclined position shown by full lines in Fig. 1, where it is supported in stable equilibrium by contact with the tilting head; or to move further rearwardly through an arc with and upon the axis of articulation of said head, to positions of rest on the truck frame.

Brackets 28, 29 are fixed to rear corners of the truck frame 10 and rise a short distance therefrom, and the upper ends of said brackets are adapted to be contacted by a cross-bar 25 of the handle member at times and support said handle member and the load in substantially horizontal position, as indicated by dotted lines in Fig. 1. A support 30, of yoke form, is pivoted at its ends to the brackets 28, 29 and is adapted to be held in upright, or somewhat forwardly inclined position, at times, in which position it may be contacted by a cross-bar 25 of the handle member to hold said handle member and the load in inclined position on the truck frame. The support 30 may be folded forwardly out of the way, in contact with the frame 10, when not required for use, as shown in the drawings, the operative position thereof being indicated by dotted lines in Fig. 1. One end of the yoke support 30 is extended beyond its pivotal connection to the bracket 28, and is formed with an outturned step or pedal 31 adapted for engagement by the foot of an operator to raise the support 30 to operative position, by downward pressure on said step or pedal. A toggle 32 pivotally connects the yoke support 30, intermediate of its ends, to a side member of the frame 10 in front of the bracket 28, and is designed, when extended, to form a brace and latch for maintaining the support in operative position. One end of the toggle 32 is extended beyond the support 30 and is formed with a laterally extending step or pedal 33 adapted for engagement by the foot of an operator. Pressure applied on the step or pedal 33, when the support and toggle are in extended position, acts to break the toggle and release the support from latched condition, and further pressure thereon acts to move the toggle and support to folded position adjacent the frame. An end of one member of the toggle 32 extends beyond the toggle pivot and is formed with a laterally extending stop lug 34 adapted to engage the other member of the toggle and prevent pivotal movement beyond the normal extended position, in which said members are in alinement as indicated by dotted lines in Fig. 1.

Movement of the handle member to vertical position facilitates receiving and depositing the load, inasmuch as it enables the operator to step close to the load, from behind, and tip the object, in case it is a single crate, box or barrel, enough to permit engagement of the nose 19 therebeneath, the truck being moved forwardly by foot pressure, for instance on the frame 10 or axle 11. I have provided a flexible connecting device, such as a chain 35, fixed at one end to the upper cross-bar 25 of the handle member and provided at its opposite end with a hook 36 adapted to engage the upper portion of an object which it is desired to load upon the truck. A forked lug 37 is mounted upon the upper cross-bar 25 of the handle member and is adapted to be engaged by any portion of the chain 35 between its ends, the chain being drawn tight and held by such engagement after engagement of the hook 36 with the load object. After the load has been engaged, in this manner or any other, the operator may apply all of his strength through rearward draft upon the grips 27 of the handle member to oscillate the handle member and with it the engaged load rearwardly until the handle member contacts with the cross-bar 18 of the tilting head. The parts are so constructed and arranged that when the handle member is in this position, shown in Fig. 1, the parts are in equilibrium (unless the load be of very abnormal shape), the center of gravity passing through the axle 11. The load may be transported with the parts in this position if desired, by pressure or draft applied to the handle member, to the load thereon, or to the truck frame. If desired and thought to be more convenient, and as is usually the case, the handle member and load may be moved to lower position on the truck and supported by the yoke support 30 as previously described, the parts assuming this position through articulation of the tilting head on its axis, by downward pressure applied on the handle member or load thereon. If desired the handle member and load may be moved to still lower and substantially horizontal position on the truck frame, the support 30 being moved to folded or inoperative position and the handle member engaging the brackets 28, 29. This is desirable where the load is to be moved a considerable distance or is to remain on the truck a considerable length of time, or where a train of trucks are to be moved conjunctively. When it is desired to deposit the load the operations above described are reversed.

A draw-bar 38, of yoke form, is pivoted to the brackets 28, 29 and is adapted to extend rearwardly from the frame 10 at times, as shown, or to be folded to inoperative position forwardly upon said frame. A link 39 is carried by the free or closed end of the draw-bar 38 and is adapted to receive attachment to a tractive device or to other similar draw-bars when it is desired to connect several trucks *en train*. Downwardly projecting lugs 40 on the draw-bar 38 are adapted for engagement with the rear end of the frame 10 to limit oscillation of said draw-bar and hold it in substantially horizontal position. A plate 41 is slidingly mounted in the forward portion of the frame 10 and is formed with upstanding ears 42 on which end portions of a forward yoke draw-bar 43 are pivoted. The draw-bar 43 is provided with a connecting link 44 at its forward or closed end for attachment to other objects. The plate 41 may be moved forwardly in the frame 10 to place the draw-bar 43 in operative position, and may be moved rearwardly in the frame to inoperative position. Forward movement of the plate and draw-bar is limited by contact of said plate with the axle bearings 12. Rearward movement of the draw-bar 43 is prevented, when in operative position, by the engagement of downwardly projecting lugs 45 thereon with the forward end of the frame 10, and said lugs may be disengaged to permit movement of the device to inoperative position by manually articulating the draw-bar upwardly on its pivots a slight distance.

In case a composite load is to be mounted on the truck, such as a pile 46 of relatively small boxes or similar articles, I find it convenient to first mount such load on a platform 47 slightly elevated by means of cleats 48 on its under surface. I then provide a special carrier, one form of which is shown in Figs. 1 and 2 and indicated generally by the numeral 49$^a$, consisting of an L-shaped frame of metal bars or angles, the horizontal portion of said frame being adapted for movement beneath the platform 47 between the cleats 48. A latch 50, formed with a rearwardly projecting handle portion is pivoted on the vertical portion of the L-shaped carrier and is adapted for engagement with and behind a portion of the handle member when said handle member is moved to vertical position behind said frame. Thus the auxiliary carrier may be attached to the handle member, and when moved beneath the platform 47 will provide means for engaging and lifting and supporting the load 46, without separate handling of the components of the load. A number of the platforms may be employed where a large number of objects such as small boxes are to be handled and moved about, and such objects may remain indefinitely in piles upon said platforms, until the need of rehandling and moving them collectively is past.

In Figs. 7, 8 and 9 I have shown another and preferred form of auxiliary carrier, indicated generally by the numeral 49, which also is of L-shape. The upper end of the vertical member of the L frame (referring to its normal or loading position shown in Fig. 9) is formed with attenuated upward projections 52 adapted to engage in rearwardly opening notches 53 formed in one of the cross-bars 25 of the handle member. Adjacent its angle the L frame is formed with outwardly opening notches 54 adapted to engage over the pivots 26. When so engaged the auxiliary frame is supported on and attached to the handle member without any auxiliary latching means, and with its normally horizontal or load-engaging portion extending at right angles to said handle member. When the handle member is turned upwardly to take on a load, the extended nose of the L carrier rides clear of the floor and glides beneath and engages the platform such as 47 shown in Figs. 1 and 2. The L carrier may be removed and replaced relative to the handle member by manually tilting it so that the projections 52 move to the rear of the cross bar 25 and into or out of the notches 53, and the notches 54 move in either direction relative to the pivot 26.

If desired some of the cross-bars 25 of the handle may be concaved or curved in their central portions, as indicated at 25$^a$ in Figs. 2 and 7, to facilitate the support and engagement of barrels, casks, or hogsheads on the truck and prevent them from rolling off sidewise. In this construction the cross-bar 18 also would be curved in its central portion.

In Figs 5 and 6 I have shown an extension nose which may be employed where it is desirable at times to handle loads which require additional basic support, as for instance goods in bags or rather loose bales. This extension consists of a yoke-shaped member 51 pivoted at its ends on the pivots 26 of the handle member and adapted at times to overlie and project beyond the nose 19 (Fig. 5) and to be turned rearwardly through an arc to inoperative position against the handle member as indicated by dotted lines, Fig. 5.

This truck combines all the qualities and advantages of both the tilting and platform types of trucks, and is an improvement on both. The oscillation of the handle members and tilting head to receive a load; the support of said members clear of the floor by a wheeled frame; the variable positions in which the load may be supported on the wheeled frame, without effort on the part of the operator; the ease of receiving and depositing a load; the facility of moving the loaded truck about and the ease with which it may be turned and steered; the adaptability to different types of load objects; and the convenience with which all operations may be performed by a single operator, all are important features of this device, and add to its desirability in use. The truck is more easily loaded than the ordinary two-wheeled tilting hand truck, or than any form of platform or multi-point support truck; and when so loaded has all the advantages of the two latter types of trucks in the way of providing a support for the load during transit or manipulation. When loaded this truck carries all of the load independently of any effort on the part of the operator, whereas the common two-wheeled truck compels the truckman to carry much of the load, subjecting him to fatiguing jolt and jar especially over rough surfaces in floors, and on inclines.

I claim as my invention—

1. The combination of a wheeled truck frame, a load-engaging member substantially triangular in side elevation pivoted at its lower rear corner on said wheeled frame, and manually controlled means pivoted on the forward corner and adapted to engage the rear corner for oscillating said load-engaging member.

2. The combination of a wheeled support, a load-engaging member substantially triangular in side elevation pivoted at its lower rear corner on said support and provided with a rigid, forwardly projecting nose, and a manually controlled handle member pivoted on the forward corner portion of and adapted to engage the upper corner portion for oscillating said load-engaging frame.

3. The combination of an axle, supporting wheels pivoted thereon, a load-engaging member secured to said axle and in one position extending upwardly and forwardly therefrom, and a manually controlled handle member pivoted on the forwardly projecting portion of said load-engaging member and movable through an arc relative thereto, said handle member being adapted when moved in one direction to engage the upwardly projecting portion of and oscillate said load-engaging member.

4. The combination of a wheeled support, and a tilting head pivoted on said support and including spaced side members extending forwardly and upwardly from the pivot, and a cross-bar connecting the upwardly projecting portions of said side members, together with a manually controlled handle pivoted to and between the forwardly projecting portions of said side members and movable through an arc relative thereto, said handle member being adapted when moved in one direction to engage said cross-bar to oscillate said head and a load carried thereby.

5. In a device of the class described having a horizontally arranged truck frame, an axle and supporting wheels for one end of said frame and a steering and supporting wheel for the opposite end of said frame, the combination with said truck frame of a loading device comprising a tilting head pivoted on said axle and provided with a forwardly extending nose normally clear of the supporting surface but adapted to be depressed by elevation of the opposite end of the frame to engage and receive a load, and a manually controlled handle pivoted to the forward portion of said head in spaced relation to the pivot thereof, said handle being adapted to engage an upwardly projecting portion of and oscillate said head and a load carried thereby.

6. A device of the class described, comprising a truck frame, supporting wheels for one end of said frame, a swivel caster carrying the opposite end of said frame, a tilting head pivoted at one end portion of said frame and provided with means for engaging a load, and a manually controlled handle pivoted on the forward portion of said head adjacent the load-engaging means and movable through an arc independently of and conjunctively with said head, the load-engaging means and pivot of the handle being movable into close proximity with the supporting surface for receiving or discharging a load.

7. A device of the class described, comprising a wheeled support, a tilting head pivoted on and normally projecting outwardly and upwardly from said support and formed at its outer end with a load-engaging nose, and a manually controlled handle pivoted on the outer end portion of said head, said handle being manually movable independently of said head to vertical position to receive or discharge a load and also being movable through an arc to engagement with the upper portion of said head and being further movable through an arc for oscillating said head relative to the support.

8. A device of the class described, comprising a wheeled truck frame, a tilting head pivoted on the forward axle thereof and provided with projecting means for engaging a load, and a manually controlled handle pivoted on the forward portion of said head, the pivot of said handle being between said load-engaging means and said forward axle, said handle being manually movable through an arc to vertical position above said load-engaging means and also being movable through an arc rearwardly to contact with the upper rear portion of said head, and being further movable through an arc rearwardly to oscillate said head relative to the truck frame.

9. A device of the class described, comprising a wheeled truck-frame, a load-engaging device pivoted at one end thereof, a support pivoted at the opposite end of said frame from the load-engaging device and disconnected from but adapted for engagement thereby at times to support it and the load in an inclined position, and means for holding said support in supporting position, said support also being foldable upon said frame.

10. A device of the class described, comprising a wheeled truck frame, a load-engaging device pivoted at the forward end thereof, a support pivoted at the rear end of the truck frame and foldable thereupon into inoperative position, and a toggle device pivoted to said frame and to said support and adapted to hold the support in operative position for engagement by said load-engaging device, whereby the device and load are supported in an inclined position, said support being extended beyond its pivot and provided with foot-operated means for raising it to operative position.

11. A device of the class described, comprising a wheeled truck frame, a load-engaging device pivoted at the forward end thereof, a support pivoted at the rear end of the truck frame and foldable thereupon into inoperative position, and a toggle device pivoted to said frame and to said support and adapted to hold the support in operative position for engagement by said load-engaging device, whereby the device and load are supported in an inclined position, said toggle being extended beyond its pivot to said support and provided with foot-operated means for breaking the toggle and returning the support to inoperative position.

12. A device of the class described, comprising a wheeled truck frame, and a tilting head pivoted on the forward portion of said frame, said head being provided with a forwardly projecting nose adapted to engage beneath a load, means on said head being provided to engage said frame and limit forward oscillation of said head, and normally prevent engagement of said nose with the supporting surface.

13. A device of the class described, comprising a wheeled truck frame, and a tilting head pivoted on the forward portion of said frame, said head being formed with a forwardly projecting nose adapted to engage beneath a load, said head also being formed with stops projecting over and adapted to engage said frame at times whereby forward and downward oscillation of said head is limited and said nose normally prevented from engagement with the supporting surface over which said wheeled frame travels.

14. A device of the class described, comprising a wheeled truck frame, and a tilting head pivoted on the forward portion of said frame, said head being formed with a forwardly projecting nose adapted to engage beneath a load, said head being formed with stops projecting over and adapted to engage said frame at times, whereby forward and downward oscillation of said head is limited, and screw devices mounted adjustably in said frame and adapted to receive contact of said stops and regulate the extent of downward movement thereof.

15. A device of the class described, comprising in combination with a wheeled truck frame formed with parallel side bars, a plate slidably mounted between said side bars, and a draft device overlying and pivoted to said sliding plate, said draft device being provided with downwardly projecting lugs adapted to engage the end of the truck frame to prevent sliding movement of said plate when moved to extended position.

16. In a device of the class described having a wheeled truck frame, the combination with said frame of a tilting head pivoted at the forward portion thereof, said head comprising spaced members of generally triangular form, a load-engaging nose fixed to and connecting forward portions of said members, a cross-bar fixed to and connecting rear portions of said members, and a manually controlled handle pivoted to said members adjacent said nose and adapted for independent oscillation forwardly of said members and also adapted for engagement with said cross-bar to cause rearward oscillation of said members and the load-engaging nose.

17. The combination with a wheeled element adapted for continuous contact with a tread surface, of a load-supporting device pivoted at one end to one end portion of said wheeled element, a support pivoted to said wheeled element and spaced from the load-supporting device, said support being disconnected from said load-supporting device but adapted for engagement thereby at times to support it and the load in an inclined position, said support being movable through an arc relative to and foldable upon said wheeled element, and bracing means adjustably connecting said support and wheeled element independently of the load-supporting device.

JOHN LOUCIEN CHESNUTT.